SOLAR CELL PANEL HAVING CELL EDGE AND BASE
METAL ELECTRICAL CONNECTIONS

Filed Feb. 14, 1964

INVENTORS.
KRISHAN S. TARNEJA
MOHAMMED S. SHAIKH
BY ROBERT K. RIEL
C. L. Menzemer
ATTORNEY.

3,421,943

SOLAR CELL PANEL HAVING CELL EDGE AND BASE METAL ELECTRICAL CONNECTIONS

Mohammed S. Shaikh, Mountain View, Calif., and Krishan S. Tarneja, Pittsburgh, and Robert K. Riel, Irwin, Pa., assignors to Westinghouse Electric Corporation, East Pittsburgh, Pa., a corporation of Pennsylvania Filed Feb. 14, 1964, Ser. No. 345,011
U.S. Cl. 136—89 3 Claims
Int. Cl. H01l *1/00*

This invention relates to solar cells and in particular concerns a novel grid contact arrangement in solar cells as well as large area solar cell panels made from the resulting single solar cells.

One of the most important parameters that limit the efficiency of the solar cell is its series resistance. Various methods have been devised to reduce the series resistance among which the use of grid contacts on the diffused surface gave most satisfactory results. One of the serious disadvantages of grid structures is that part of the active area of the cell is lost.

As the light shines on the p-layer of a solar cell, electron-hole pairs are created in the diffused region. The holes travel toward the contact on the p-layer while the electrons diffuse through the junction and are collected by the contact on the n-side. The series resistance of the cell partially depends upon the distance through which the carriers have to travel before they are collected. The holes generated in the bulk away from the p-layer and junction must travel a distance approximately equal to the width of the cell. The holes situated in the vicinity of the surface where the ohmic contact is located have to travel a very negligible distance to reach the contact. Thus, the average distance through which the holes travel before they are collected in case of a single strip contact cell, is approximately equal to half the width of the cell. If the strip contact is situated in the center of the cell, the average distance may be lessened.

Since the series resistance of the cell partially depends upon the average distance the carrers have to travel, an infinitely large number of collectors will have to be spread over the solar cell surface in order to make the distance travelled by the carriers a minimum and thereby achieve low series resistance. However, the larger the number of collectors or grids, the larger will be the loss in active area since the area occupied by the collectors blocks out light and therefore will not contribute to any power.

Various grid patterns are now being used in which the entire grid structure is located on the diffused surface of the cell. The grid structure consists of a number of metallic strips joined by a common bus-bar. In conventional designs of solar cells, the bus-bar also is located on the active surface of the solar cell. Since the bus-bar has to be wide enough to carry the current density, a further appreciable loss in active area results because of the location of the bus-bar on the active surface.

It is therefore an object of the present invention to provide a new arrangement of contact members on a structure operative as a solar cell whereby a larger area of active surface is available than has heretofore been possible, based on any given number of contact members contemplated.

It is another object of the invention to provide a solar cell panel made from solar cells produced in accordance with the foregoing object.

Other objects will be apparent from time to time in the following detailed discussion and description.

The invention will be most readily understood upon considering its description in conjunction with the attached drawings in which.

Figure 1:
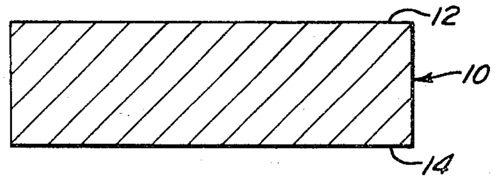
FIG. 1 is a side view of a slice of semiconductive silicon used in practicing the present invention.
Figure 2:
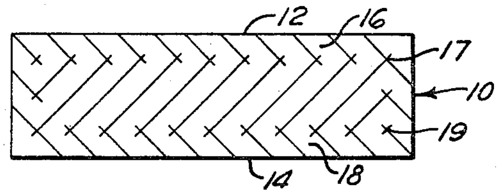
FIG. 2 is a side view of the slice of silicon of FIG. 1 after diffusion has been carried out.
Figure 3:
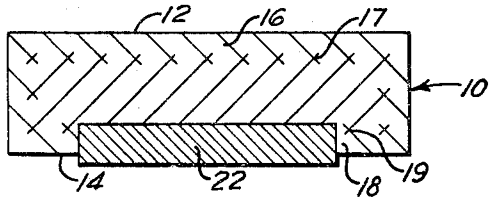
FIG. 3 is a side view of the slice of semiconductive silicon showing a large area contact in the bottom surface thereof.

In accordance with this invention, improved solar cells are made in which the losses heretofore accompanying bus-bar practice are avoided. In solar cells of the invention, bus-bars are omitted, and metal contact or current collectors are located on the side edges of a semiconductive shape. Hence these members do not block off active areas of the cell. Moreover, these edge metal contacts further serve as convenient inter-cell electrical leads in assemblies of such cells to form solar panels.

Referring now to the drawings, there is shown a slice 10 of single crystalline silicon that may, for purposes of illustration, be considered of n-type semiconductivity. Of course, p-type semiconductivity material could be used as well. Moreover other semiconductive materials such, for example, as Group III–V compounds could also be used. In addition the semicondutcive material may be the web portion of a webbed dendrite, for example a webbed dendrite as produced in accordance with the invention in the United States patent of Dermatis and Faust, Ser. No. 98,618 filed Mar. 27, 1961, now Patent No. 3,129,061 and assigned to the assignee of this application. Other ways of producing suitable semiconductive material are disclosed in the patent and technical literature to which reference may be made. Suitably the silcon slice 10 has a resistivity on the order of 0.1 to 1.0 ohm-cm. though a material of higher or lower resistivity could as well be used and may have a thickness of about 5 to 30 mills. The opposed major surfaces 12 and 14 can have dimensions of about 1 x 2 cm. though larger or smaller sizes could also be used. For example, webbed dendrites can be produced up to 12 or more inches in length and can be used in this invention.

The slice of silicon is treated to diffuse into at least its major surfaces 12 and 14 an opposite conductivity type material. Since n-type semiconductivity has been assumed for purposes of illustration, the material diffused into the crystal will be p-type, for example, boron, aluminum, gallium or indium, with boron as boron trichloride, being particularly satisfactory. This can be accomplished by placing the slice 10, after suitable cleaning, etching and the like procedures have been applied, in a furnace in which there is an atmosphere of p-type conductivity dopant. The furnace used must withstand the temperature and pressure conditions attained during diffusion, and should not introduce undesired impurities. A clean quartz tube has been found to be satisfactory. Conditions suitable for diffusion of the p-type dopant are maintained for a period, e.g. a few minutes to several hours, sufficient to form a shallow p+ region, for example of about 0.1 to 1.0 micron thick. This may be advantageously accomplished by using two temperature zones within the furnace. Where the silicon is maintained, the temperature can be on the order of about 600° to 1250° C. In the lower temperature zone, which is normally about 250° to 750° C., there is maintained a crucible or boat containing the material to supply the p-type conductivity dopant. The acceptor can also be provided in gaseous form and in that instance suitably is entrained in a gas supply used to control the atmosphere in the furnace. In this latter practice, a single temperature zone within the furnace is satisfactory. Boron trichloride is a good doping material and is normally supplied by being entrained as just indicated. However accomplished there results a thin layer 16 along the top surface 12 of the slice 10 and a similar layer 18 along the bottom surface 14. Since the bulk semiconductive material is n-type, there also result p-n junctions 17 and 19 near the top and bottom respectively of the semiconductive substrate.

In accordance with the present invention there is now applied to the bottom surface 14 of the slice 10 of semiconductive silicon a large area metal contact 22. This suitably can be n-type gold foil or other n-type contact metal, and is alloyed with the bottom surface 14 in a manner such that the alloyed zone will penetrate the p-type layer 18 into the bulk n-type semiconductive silicon. This is readily accomplished in view of the very thin character of the diffused p-type layer thereon which, as noted above, generally is less than 2 microns thick. Alloying is accomplished by heating, to about 300° to 800° C. for a few minutes, the foil in contact with the silicon slice. It is to be noted that in conventional practice in making diffused type solar cells, it has been common to lap off the diffused layer on one of the major surfaces and then make contact to the exposed bulk. Since the alloying in this invention penetrates that layer and thereby makes good ohmic contact with the n-region of the bulk, that lapping step can be omitted.

Figure 4:
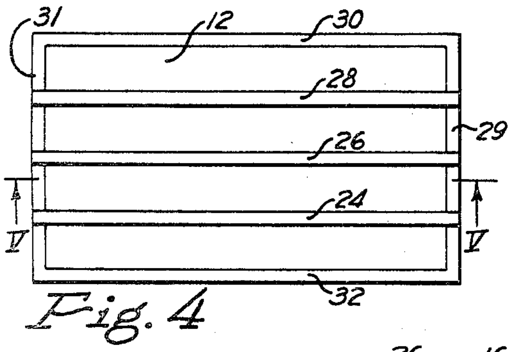
FIG. 4 is a top plan view showing a grid arrangement in accordance with the present invention.
Figure 6:
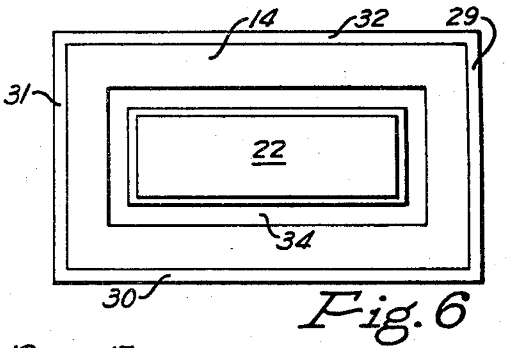
FIG. 6 is a bottom view of the device of FIG. 5.
Figure 5:
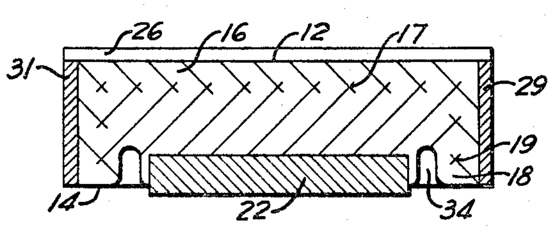
FIG. 5 is a sectional view of the device of FIG. 4 taken through line V—V of FIG. 4, showing the isolation of the contact on the bottom of the slice of semiconductive silicon.

After cleaning of the surfaces, the structure is now ready for the application of contacts to the p-type layer 16. Cleaning is satisfactorily accomplished by immersion sequentially in hydrofluoric and nitric acids followed by rinsing and drying. The grid contacts are applied in the conventional manner, for example by plaing, by photo resist techniques, by alloying or the like. In accordance with this invention metal contacts are applied not only as a grid, shown as grid members 24, 26 and 28 in FIG. 4, but also around the edges of the slice 10. Thus, by way of example, a photo resist coating can be applied to the top surface 12, and a film exposed thereon having the desired grid arrangement which is then developed. A metal, such as aluminum, can then be evaporated thereto in the conventional manner and simultaneously will coat all the side edges to provide metalized edges 29, 30, 31 and 32. These metalized edges contact the end portions of the grid members 24, 26 and 28 and thus function in the same manner that bus-bars have heretofore. The photo resist coating remaining can then be removed without disturbing the grids or side contacts.

In order to prevent shorting of the resulting structure, it is necessary to electrically isolate the large area contact 22 that is on the bottom surface of the structure from lateral contact with the active diffused layer. While any desired procedure to accomplish this can be used, a satisfactory method involves coating the surface with an etch resistant coating such, for example, a wax, resin or dopant. Then areas to be removed are defined by marking or scribing, with a sharp tool, through the etch resistant coating to the silicon substrate. Etchant is then applied thereto in a manner sufficient to etch the p-layer into the n-type bulk material, resulting in a groove 34 around metal contact 22. A hydrofluoric and nitric acid mixture is a suitable etchant for this purpose, but of course others can also be used.

Figure 7:
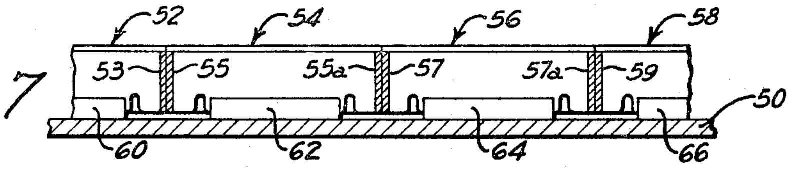
FIG. 7 is a schematic view of a panel composed of solar cells in accordance with this invention.

Referring now to FIG. 7, in view of the structure disclosed and defined above, large area solar cells can now be assembled quite simply. There is first provided a common contact or lead member 50, composed of a material, such as metal, that is a good electrical and heat conductor. Nickel and aluminum are satisfactory metals. On its upper surface are shown diagrammatically four solar cells 52, 54, 56 and 58. As shown cell 52 has a side metal edge 53; cell 54 has metal sides 55 and 55*a*; cell 56 has metal edges 57 and 57*a*; and cell 58 has metal edge 59. The cells all are arranged with their large area contact members 60, 62, 64 and 66 resting on and in good electrical contact with the common base member 50. As already noted, the side edges of each of the solar cells of this invention are covered with a current collecting metal, functioning in the same manner as the prior art bus-bar for the grid contact members on the active layer of each cell. The solar cells in FIG. 7 are of regular configuration, such as square or rectangular shapes, and are arranged in an abutting relationship so that direct contact of the metal on the edges of adjacent cells provides a good electrical connection between adjacent cells. For example, edges 55*a* and 57 contact and are the inter cell lead for cells 54 and 56. It should be noted that the scribing that is practiced to electrically isolate the large area contacts on the bottom surface of each solar cell must be adequate, in the event of assembly as in FIG. 7, to avoid shorting of the active diffused layer through the base common contact member. Electrical connection to the panel can be made to the common base member and to the metalized side edge of any end cell. It is thus evident that the present invention in eliminating the bus-bars contributes to ease and efficiency in making large area solar cell panels.

The invention will be described further in conjunction with the following specific example in which the details are given by way of illustration and not by way of limitation. A slice of n-type Czochralski grown single crystalline silicon having a resistivity of 0.1 ohm-cm., being 10 mils thick and with major faces of 1 x 2 cm. is used. After etching its surfaces, washing and drying, the slice is placed on a clean, dry quartz boat and advanced into a furnace containing an atmosphere of nitrogen. Power to the furnace is set to provide a temperature of 850° C. With nitrogen flowing at a rate of 2 liters per minute, boron trichloride is admitted at a rate of 5 to 10 cc. per minute for about 8 minutes. Then the boron trichloride flow is terminated and the furnace temperature is raised to 1150° C. After one-half hour, the temperature is lowered to 500° C. and the slice of silicon is removed. There results a boron doped layer on all surfaces of the silicon to a depth of about one micron, the layer having a boron concentration on the order of $10^{21}$ atoms per cc.

Then a one mil thick foil composed, by weight, of 0.5 percent antimony and the remainder gold, and having dimensions of about 0.75 x 1.75 cm., is placed on one of the surfaces of the diffused silicon slice. This foil is alloyed to the slice by heating the assembly to about 700° C. for 10 minutes in a vacuum furnace at a pressure below about $10^{-3}$ mm. of Hg. At these conditions, the foil alloys with the silicon to a depth of about 0.75 mil, and thus contact is made with the n-type bulk through the diffused p-type layer thereon.

The other major surface is painted with a photo resist coating, and after application and development of a film with a three component grid, aluminum is evaporated thereto. This is accomplished by heating a container of aluminum at about 750° C. in an evacuated furnace containing the slice of silicon for about one hour. Aluminum coats the entire surface and edges. Excess aluminum is removed from the surface by removal of the photo resist coating, for example by solubilizing in a solvent such as alcohol or trichloroethylene.

Then Apiezon wax is coated around the large area contact on the bottom surface. A line is scribed through the wax around that contact, and a groove etched therein to the n-type bulk with a mixture of equal parts of hydrofluoric and nitric acids. Then excess wax is removed by solvents such as alcohol and trichloroethylene.

From the foregoing discussion and description it is evident that the invention provides a uniquely simple and advantageous manner of securing more useful active surface area in solar cells for any given grid contact arrangement. Moreover, it provides a cell that facilitates assembly of cells to a solar panel. For example, five or more cells produced as just stated can be aligned on a sheet of nickel in end-to-end relationship with adjacent metal ends in contact and their large area contacts on the nickel sheet. By providing leads to the nickel sheet and to one end cell, a solar panel is readily provided. While the invention has been described with respect to specific materials and procedures it will be evident that substitutions, changes and the like can be made from the specific details without departing from its scope.

What is claimed is:

1. A solar cell panel comprising a plurality of individual solar cells, a metal base member, each of said cells comprising a body of semiconductor material of a first conductivity type and a low resistivity and having opposed major surfaces, a thin opposite conductivity type diffused layer in each of the major surfaces, a large area metal contact member on one of the surfaces and alloyed to the first conductivity type bulk through the opposite conductivity type diffused layer on that surface, a groove through the opposite conductivity type layer about the large area contact to electrically isolate that member from lateral contact with that layer, at least one small area ohmic conact to the opposite conductivity type diffused layer on the other major surface, and a metal contact member on the edges of the body and in electrical contact with the said small area ohmic contact; at least two of said cells having their edge metal contact members arranged in abutting relationship and in contact with one another on said metal base member, the cells being arranged with their large area contact members resting on and in electrical contact with said metal base member, and the edge metal contact members comprising inter-cell electrical leads.

2. A solar cell panel in accordance with claim 1 in which the semiconductive material is silicon.

3. A solar cell in accordance with claim 1 in which the semiconductive material is a webbed dendrite of silicon.

References Cited

UNITED STATES PATENTS

| | | | |
|---|---|---|---|
| 2,794,846 | 6/1957 | Fuller | 136—89 |
| 2,820,841 | 1/1958 | Carlson et al. | 136—89 |
| 2,861,018 | 11/1958 | Fuller et al. | |
| 3,129,061 | 4/1964 | Dermatis et al. | |
| 3,255,047 | 6/1966 | Escoffery | 136—89 |
| 3,278,811 | 10/1966 | Mori | 136—89 X |
| Re. 25,647 | 9/1964 | Mann et al. | 136—89 |

ALLEN B. CURTIS, *Primary Examiner.*